United States Patent
Matsui et al.

(10) Patent No.: US 7,123,815 B2
(45) Date of Patent: Oct. 17, 2006

(54) DATA PLAYBACK APPARATUS

(75) Inventors: Yoshinori Matsui, Nara (JP); Kazuya Fujimura, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1119 days.

(21) Appl. No.: 09/838,174

(22) Filed: Apr. 20, 2001

(65) Prior Publication Data

US 2002/0001261 A1    Jan. 3, 2002

(30) Foreign Application Priority Data

Apr. 21, 2000    (JP)    ............................. 2000-120755

(51) Int. Cl.
*H04N 5/91*    (2006.01)
*H04N 7/00*    (2006.01)

(52) U.S. Cl. .......................................... 386/94; 386/46

(58) Field of Classification Search ................. 386/94, 386/46, 109, 111, 112, 27, 33, 68, 124, 125, 386/45, 69, 70, 60, 1; 360/15
See application file for complete search history.

(56) References Cited

U.S. PATENT DOCUMENTS

| | | | |
|---|---|---|---|
| 5,361,173 A | * | 11/1994 | Ishii et al. .................... 360/27 |
| 5,917,914 A | | 6/1999 | Shaw et al. |
| 6,122,436 A | | 9/2000 | Okada et al. |
| 2002/0126158 A1 | * | 9/2002 | Camara et al. ............. 345/810 |
| 2003/0007780 A1 | * | 1/2003 | Senoh ........................ 386/68 |
| 2005/0135619 A1 | * | 6/2005 | Morley et al. ............... 380/217 |
| 2005/0185932 A1 | * | 8/2005 | Yamamoto et al. ........... 386/95 |

FOREIGN PATENT DOCUMENTS

EP    0929072 A    7/1999

* cited by examiner

*Primary Examiner*—Robert Chevalier
(74) *Attorney, Agent, or Firm*—Wenderoth, Lind & Ponack, L.L.P.

(57) ABSTRACT

The present invention relates to a data playback apparatus which efficiently performs playback or erasure of a program composed of video or audio which is stored in a memory card. A decoding unit for reading data from the memory to decode the read data retrieves an ID which matches a program ID designated by the user from a program file management data file, reads a movie data file in the folder of the designated program and decodes the read data, by referring to the relevant program information.

1 Claim, 11 Drawing Sheets

Fig.10

Example of access information

| PRG | Number of accesses | Access data/time |
|---|---|---|
| 1 | 2 | March 2, 10:05 |
| 2 | 1 | March 14, 23:12 |
| 3 | 4 | March 8, 06:16 |
| 4 | 3 | March 10, 16:24 |

Display example of chart obtained by rearranging programs in order of descending number of accesses

| PRG | Number of accesses |
|---|---|
| 3 | 4 |
| 4 | 3 |
| 1 | 2 |
| 2 | 1 |

DATA PLAYBACK APPARATUS

FIELD OF THE INVENTION

The present invention relates to a data playback apparatus for reading data from a memory containing media data such as video and audio which has been compressed according to a compression coding method such as MPEG, and for decoding and playing the data.

BACKGROUND OF THE INVENTION

In recent years, with advances in the compression coding technology for media data such as video and audio, techniques for manufacturing optical disks and magnetic disks and recording/playback techniques, it has become possible to record media data of several hours on an optical disk or magnetic disk, and play back the same. In the case of a DVD (Digital Video Disc, or also called Digital Versatile Disc) which is now rapidly coming into wide use, a movie of about two hours can be recorded on an optical disk, by using MPEG2 or the like as the compression coding method, and played back. In addition, it is expected that a DVD recorder having functions which are equivalent to those of a present VCR (Video Cassette Recorder) and are realized by an optical disk will be shortly made available. Hereinafter, a data structure in the DVD recorder as a prior art of the data playback apparatus and the operation of the recorder will be described.

FIGS. 11(a)–11(c) are schematic diagrams for explaining a data structure in the DVD recorder (see "DVD Specifications for Rewritable/Re-recordable Discs Part3 VIDEO RECORDING Version 1.0, September 1999").

FIG. 11(a) shows an entire data structure in a DVD, which is composed of a DVD_RTAV folder 1101, a management data file 1102, a movie data file 1103, a still-picture data file 1104, and an audio data file 1105. The DVD_RTAV is a folder which contains the files 1102–1105. The management data file 1102 includes entire information of the DVD such as the title text and updated date, and information concerning each program included in the DVD. Here, the program is one playback unit, i.e., a broadcast program. For example, news, a baseball relay broadcast, a movie and the like are programs, respectively. The management data file 1102 includes the title, creation date, playback duration, start address of the movie data file and the like, as information concerning each of the programs. The movie data file 1103 is a file which is obtained by concatenating plural programs. One example of the movie data file 1103 is shown in FIG. 11(b). In this example, the movie data file 1103 is composed of three programs, i.e., a first program 11031, a second program 11032 and a third program 11033. In the movie data file 1103, as shown in FIG. 11(c), compressively coded data of audio and video are multiplexed in units referred to as "PACK". The size of a pack in the DVD recorder is fixed at 2048 bytes. In the still-picture data file 1104, plural pieces of compressively coded still-picture data are multiplexed in units of pack. This is used as data for a slide show in which display images are switched at prescribed periods. In the audio data file 1105, compressively coded audio data are similarly multiplexed in units of pack. This is for use on the postrecording to movie data.

FIG. 12 is a diagram for explaining an example of program playback when the second program 11032 shown in FIG. 11(b) is to be played. Address information for indicating from which byte in the movie data file 1103 the playback is to be started is recorded in the management data file 1102, for each program. Therefore, when the second program 11032 is to be played, start address information 1201 of the second program is initially extracted from the management data file 1102 and, in accordance with this start address information, the reading position of the movie data file 1103 is moved to a position indicated by the start address information 1201. Then, the data are read out, whereby the playback can be started from the second program.

In order to perform high-seed searching playback of a program or program searching playback, information of reading positions in the movie data file at intervals of about one second is included in the management data.

Next, the program erasure in the DVD recorder is described with reference to FIG. 13. In FIG. 13, numeral 1103 denotes a movie data file before program erasure, which is composed of three programs in this case. Assuming now that the second program 11032 is to be erased, the third program 11033 is concatenated immediately after the first program 11031, as shown by reference numeral 1303. Simultaneously, the information concerning the second program 11032 is also erased from the management data file.

In the above descriptions, the outlines of the data structure in the DVD recorder and the operation for playing or erasing a program are given.

As described above, in the DVD recorder as the prior art data playback apparatus, the media data such as video and audio are recorded as a movie data file in which plural programs are concatenated. The object to concatenate plural programs as one file is to make the best use of the capacity of a disc. However, in this data structure, the following problems occur.

Initially, it is required to extract start addresses of all programs to decide reading positions of the movie data file in the management data file, and as a result, the structure of the data playback apparatus is complicated. Further, when the number of programs is increased, there is a risk that the size of the management data becomes enormous due to the start address information. In portable information terminals using MPEG4 as the latest media data compression coding technology, the coding bit rate of media data is assumed to be approximately 64~384 Kb/sec., which is some-tenths as large as the coding bit rate of a DVD using MPEG2, or smaller. Further, in the portable information terminals, it is assumed that media data is obtained by radio communication. It is expected that the playback time of one program becomes relatively short, for example, approximately some dozen seconds to some minutes, to suppress the communication charges. Therefore, there is a possibility that the number of programs recorded on one disc is substantially increased.

In addition, upon the erasure of a program, a process of concatenating unerased programs to recreate a movie data file is required. Since the portable information terminal uses a secondary battery such as a lithium ion, the above-mentioned program concatenation/recreation processing reduces the utilization time at one charge, thereby decreasing the user's operability.

SUMMARY OF THE INVENTION

An object of the present invention is therefore to provide a data playback apparatus which improves a file structure and carries out a processing in accordance with the file structure.

Other objects and advantages of the present invention will become apparent from the following detailed description, and the specific embodiments described herein are provided only for illustration since various additions and modifications within the spirit and scope of the invention will be apparent to those skilled in the art from the detailed description.

To achieve the above object, the start address information of each program in the management data is dispensed with, thereby facilitating the access in program units. Consequently, the structure of the data playback apparatus can be simplified.

A data playback apparatus according to a first aspect of the present invention comprises: a memory which has at least one program data folder each containing a program composed of compressively coded data including at least one video data file, and a management data folder containing management data which include information each indicating attribute information, a playback duration, and title information concerning each program; a decoding unit for selecting at least one program data folder by referring to the management data on the basis of playback instruction data, which are information concerning an instruction of playback of a program and are input from outside the apparatus, reading compressively coded data which are stored in the selected program data folder, decoding the same, and outputting decoded data; and a display unit for displaying the decoded data. Therefore, the start address information for each program in the management data is dispensed with, and as a result, the access in units of a program can be facilitated. Consequently, the structure of the data playback apparatus can be simplified.

According to a second aspect of the present invention, in accordance with the data playback apparatus of the first aspect, a decryption unit is included between the memory and the decoding unit, at least part of the compressively coded data is encrypted, and the decoding unit requests compressively coded data from the decryption unit. Furthermore, the decryption unit reads the requested compressively coded data from the memory, carries out decryption, and outputs decrypted compressively coded data to the decoding unit. Therefore, a program which includes media data which have been encrypted and stored in the memory can be played.

According to a third aspect of the present invention, in accordance with the data playback apparatus of the first aspect, the management data include information indicating the number of the program data folders, and information concerning each program data folder, the number of which information is equal to the number of the program data folders. Therefore, the number of programs stored in the memory can be easily obtained, and further, the information depending on the program can be obtained collectively.

According to a fourth aspect of the present invention, in accordance with the data playback apparatus of the third aspect, the decoding unit, on the basis of erasure instruction data input from outside the apparatus, which are information concerning an instruction of erasure of a program, erases the program data folder and data in the program data folder, as well as generates new management data in which the information indicating the number of the program data folders has been updated and the information concerning the program data folder to be erased has been eliminated, and replaces the management data stored in the management data folder with the generated management data. Therefore, the program concatenation processing that is performed in the prior art apparatus upon the program erasure can be dispensed with, the loads on the data playback apparatus can be reduced, and further, the relationship between the management data and the program data folder can be always retained accurately.

According to a fifth aspect of the present invention, in accordance with the data playback apparatus of the first aspect, the program data folder contains playback control data which are information concerning a control of playback of a program stored in the program data folder itself, and the decoding unit reads the compressively coded data on the basis of the playback control data and decodes the coded data. Therefore, the playback control data and the media data can be collectively erased upon the erasure of the program data folder, and consequently, the structure of the data playback apparatus can be simplified.

According to a sixth aspect of the present invention, in accordance with the data playback apparatus of the first aspect, the management data include data protection information which is information concerning permission or inhibition of erasure of each program data folder and data in the program data folder, and the decoding unit receives erasure instruction data which are information concerning an instruction of erasure of a program, from outside the apparatus, and erases a program data folder indicated by the erasure instruction data and data in the program data folder when the data protection information for the program data folder indicated by the erasure instruction data and the data in the program data folder shows the permission of erasure. Therefore, an erroneous erasure of the program by the user can be prevented.

According to a seventh aspect of the present invention, the data playback apparatus of the first aspect further comprises: an access information storage unit for reading/writing at least one of number-of-access information indicating the number of times that a program was played and latest access date/time information indicating a latest time when the program was played, from/onto the memory; and a chart creation unit for creating a chart by rearranging program data folders on the basis of one of the number-of-access information and the latest access date/time information, and outputting the same to the display unit. Therefore, the user can easily select the frequently accessed program. Further, when the stored program is erased from the memory, the one having a lower number of accesses or the one which has not been accessed recently is displayed with priority, thereby facilitating the selection of the program to be erased.

According to an eighth aspect of the present invention, in accordance with the data playback apparatus of the first aspect, the memory is removable. Therefore, the program previously stored by another apparatus can be played.

BRIEF DESCRIPTION OF THE DRAWINGS

FIG. 10 is a diagram showing an example of access information and an example of a chart in the data playback apparatus of the third embodiment.

DETAILED DESCRIPTION OF THE PREFERRED EMBODIMENTS

First Embodiment

A data playback apparatus according to the first embodiment of the present invention will now be described. In this first embodiment, compressively coded media data such as audio and video recorded in a memory are stored as movie data files in their respective program data folders. In addition, information such as the title of each program and the number of contained media data is stored as management data in a management data folder. The movie data file of each program data folder is decoded/played in accordance with the information of the management data. Further, the erasure of the movie data file is performed in program units. When the file is divided in program units, the management of start address information of each program and the concatenation process for data files in the program erasure and the like, which are required by the prior art DVD recorder, are omitted in the data playback apparatus of the first embodiment, and as a result the structure of the apparatus is simplified. Hereinafter, a description of the data playback apparatus is given with reference to the drawings.

Figure 1:
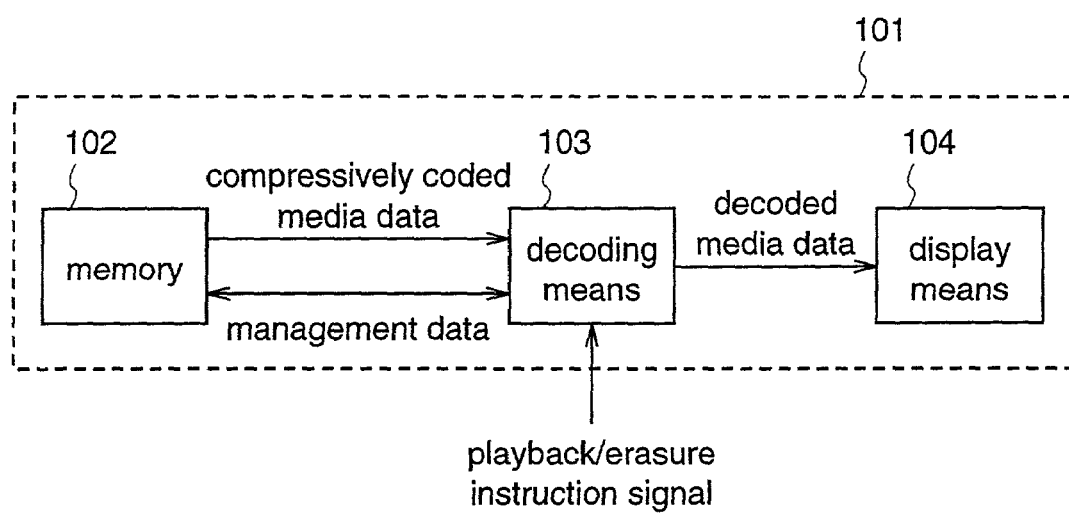
FIG. 1 is a block diagram illustrating a structure of a data playback apparatus according to a first embodiment of the present invention.

FIG. 1 is a block diagram illustrating a structure of the data playback apparatus. The data playback apparatus 101 comprises: a memory 102 for containing compressively coded media data and management data; a decoding means (unit) 103 for receiving a playback instruction signal/erasure instruction signal, receiving the media data in accordance with the management data stored in the memory 102, and decoding the media data; and a display means (unit) 104 for displaying the decoded media data.

Figure 2:
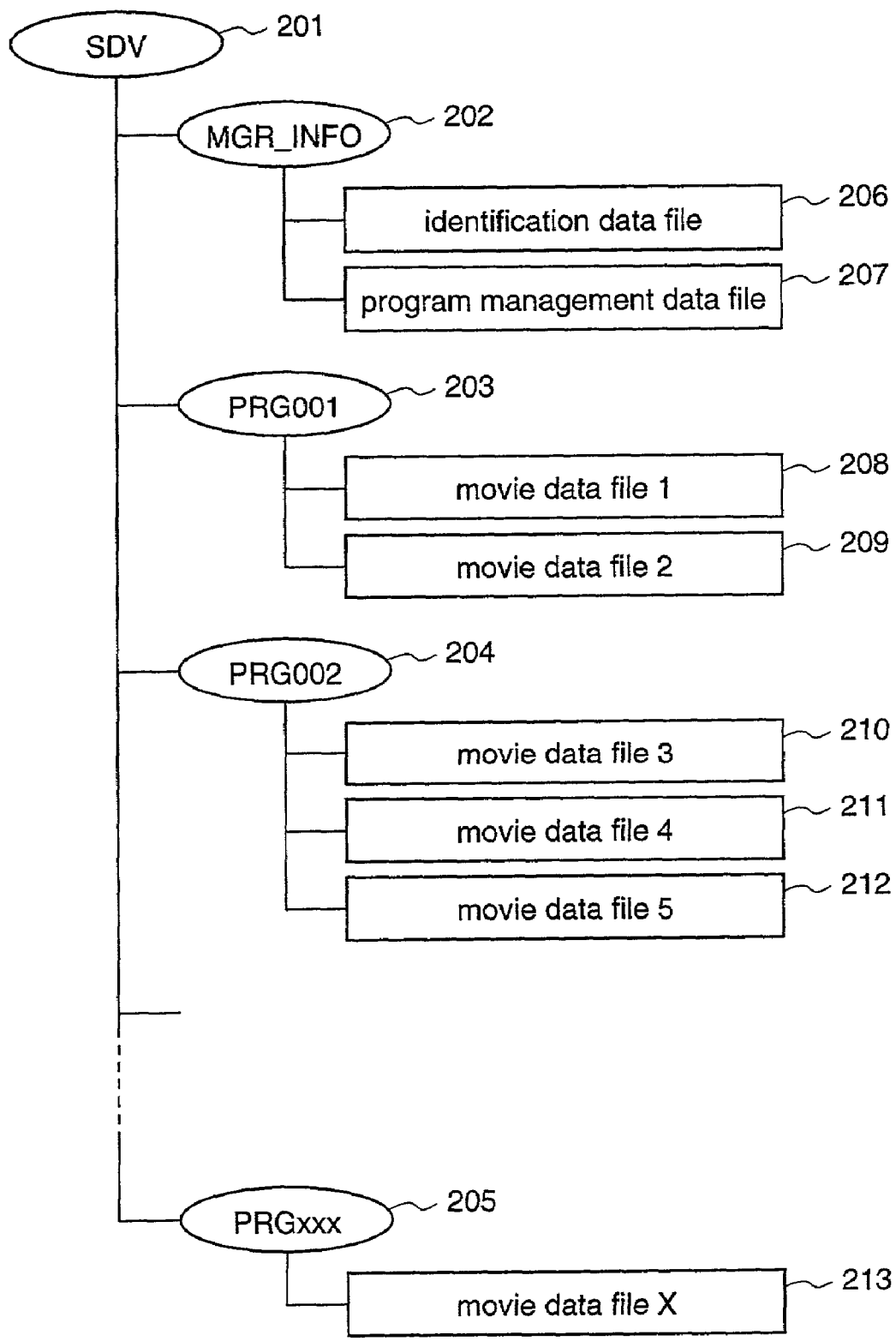
FIG. 2 is a schematic diagram for explaining a structure of a file stored in a memory of the data playback apparatus of the first embodiment.

FIG. 2 is a diagram for explaining the contents that are stored in the memory 102. Assume that circles show folders and rectangles show files, respectively. The memory 102 includes a route folder SDV 201 and, directly under this folder, a management data folder MGR_INFO (202) and program data folders PRG001~PRGxxx (203–205) are stored. In the management data folder 202, an entirety identification data file 206 including title information of the entire route folder SDV 201 and the like, and a program management data file 207 including the total number of programs and title information of each program and the like are stored. Movie data files 1 and 2 (208 and 209) are stored in the first program data folder PRG001, movie data files 3–5 (210–212) are stored in the second program data folder PRG002, and a movie data file X (213) is stored in the N-th program data folder PRGxxx.

Figure 3:
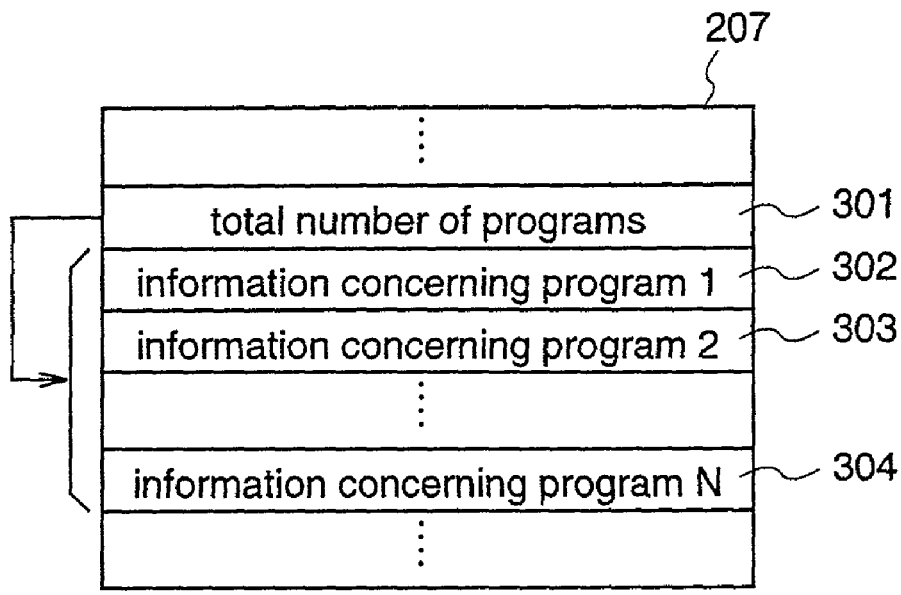
FIGS. 3(a) and 3(b) are schematic diagrams for explaining structures of a program management information file stored in a memory of the data playback apparatus of the first embodiment.
Figure 3:
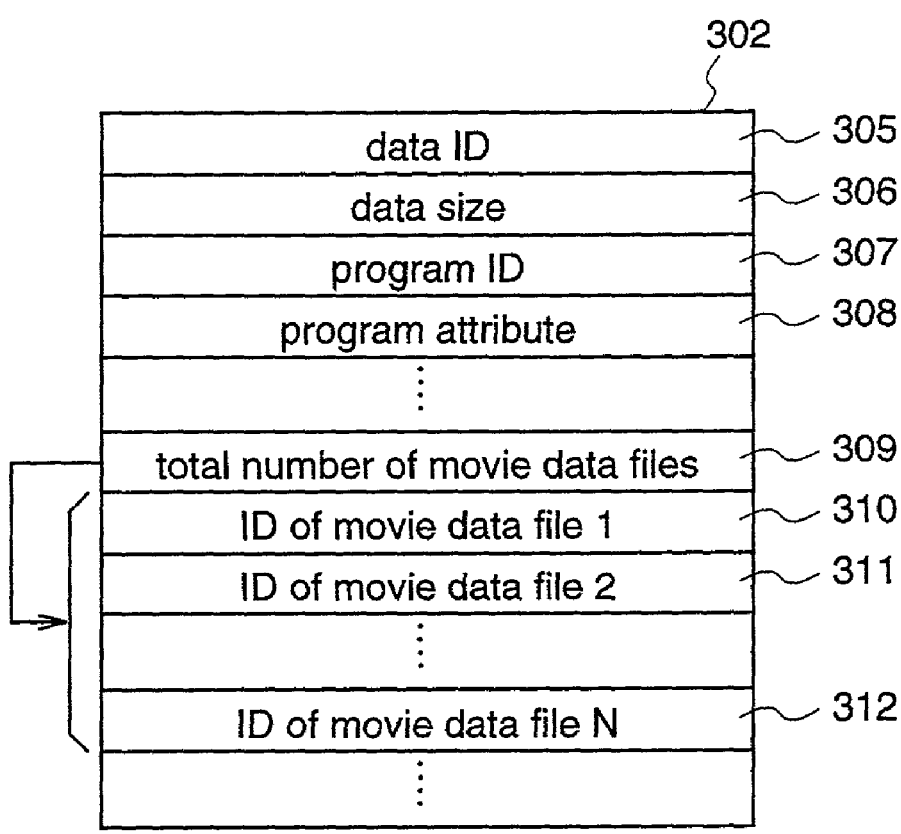

FIGS. 3(a) and 3(b) are diagrams for explaining the contents of the program management data file 207. FIG. 3(a) shows entire program management data, in which the total number 301 of programs stored in the memory 201 and information 302–304 concerning the respective programs and the like are recorded. FIG. 3(b) shows contents of the information concerning each program, in which the data ID 305, the data size 306, the program ID 307, the program attribute 308, the total number 309 of movie data files, movie data file IDs 310–312 and the like are recorded.

Figure 4:
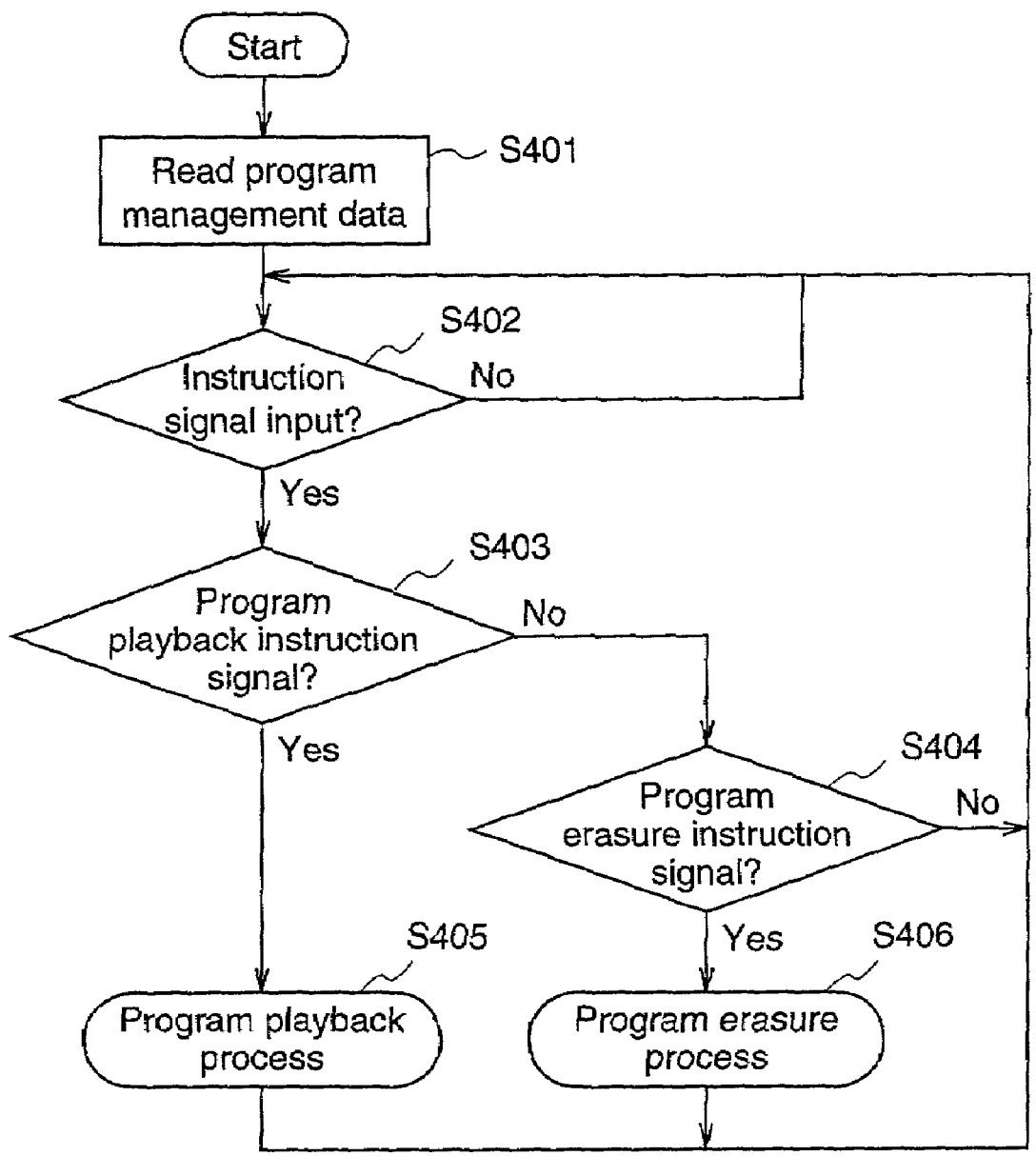
FIG. 4 is a flowchart for explaining an operation of a decoding means of the data playback apparatus of the first embodiment.
Figure 5:
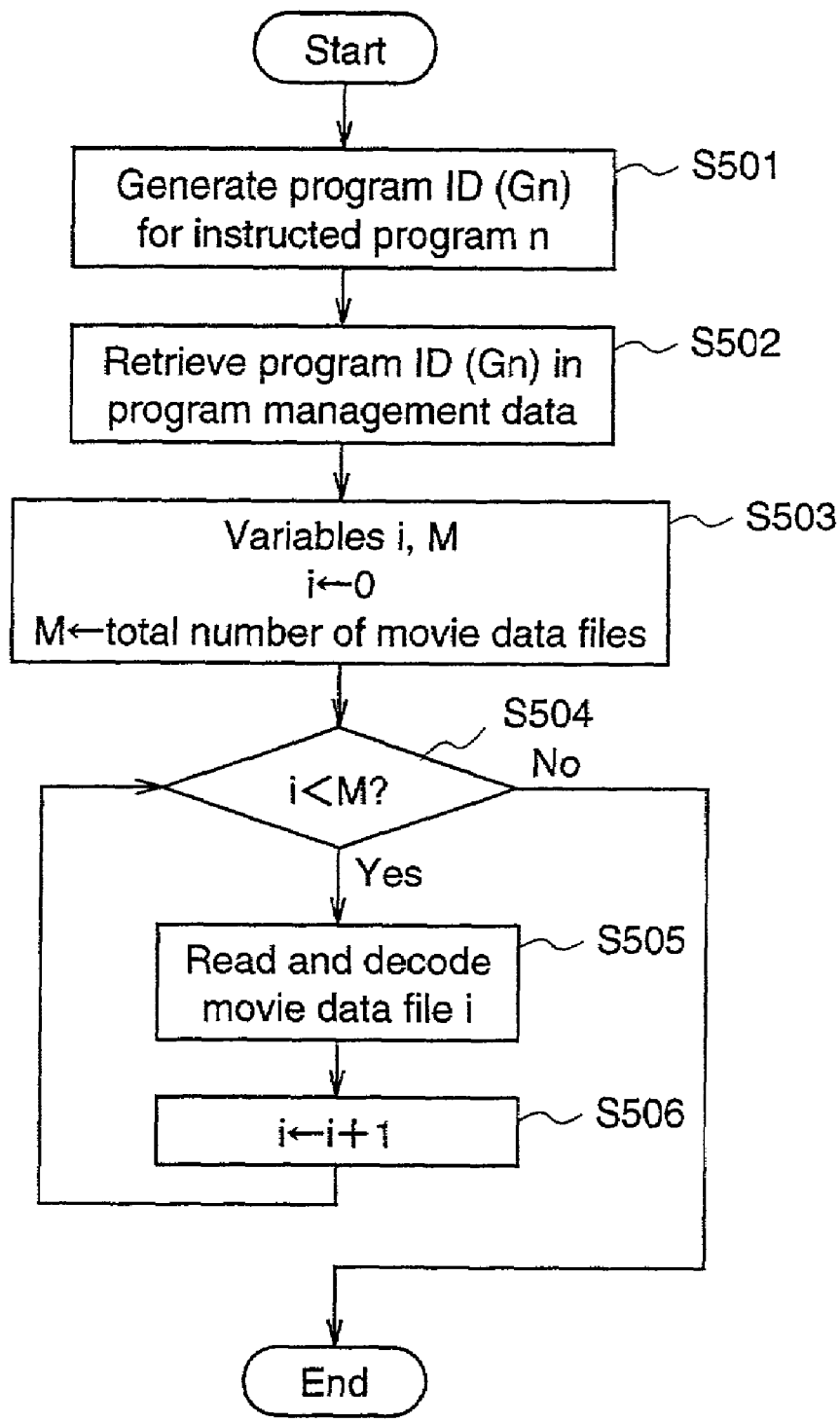
FIG. 5 is a flowchart for explaining a program playback process of the decoding means of the data playback apparatus of the first embodiment.
Figure 6:
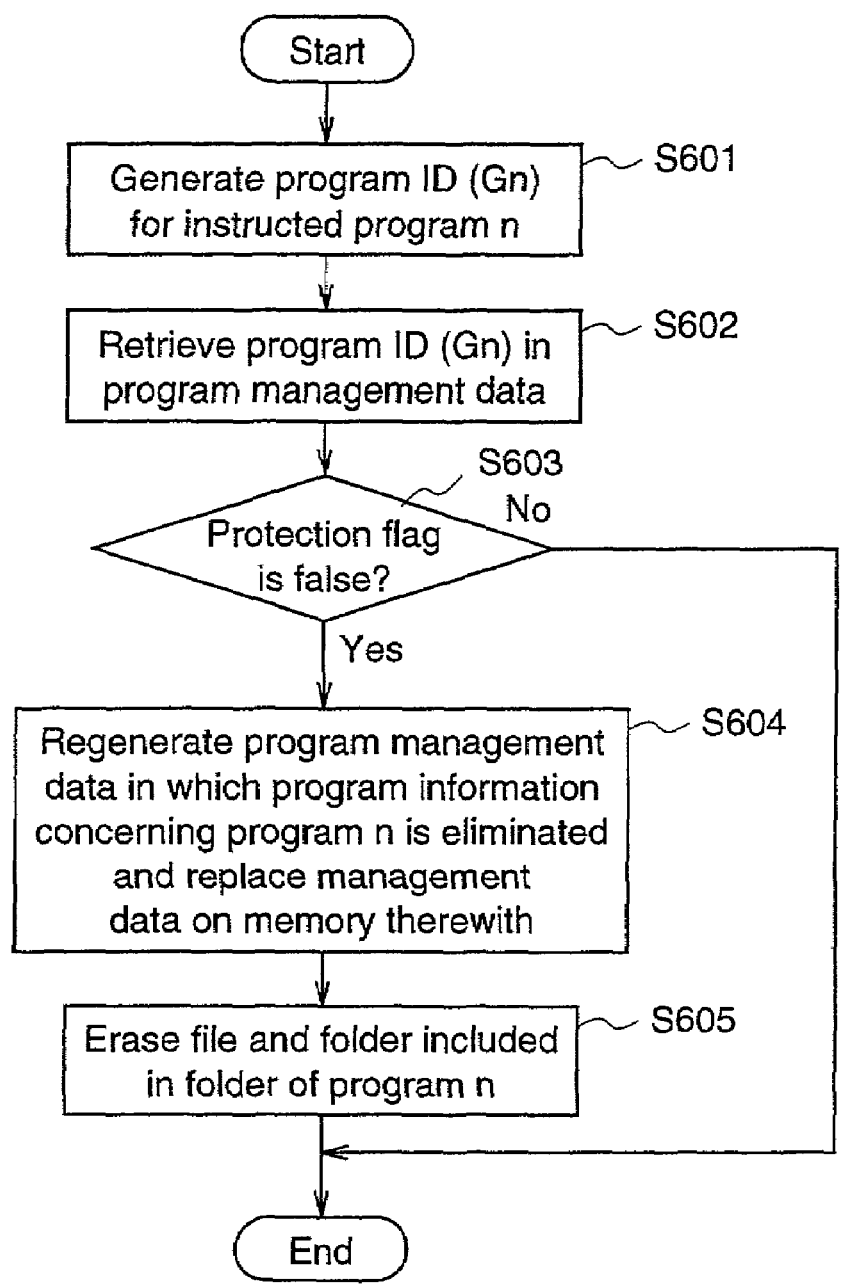
FIG. 6 is a flowchart for explaining a program erasure process of the decoding means of the data playback apparatus of the first embodiment.

FIGS. 4 to 6 are flowcharts for explaining the program playback process and the program erasure process in the decoding means 103 shown in FIG. 1.

Hereinafter, the program playback process in the data playback apparatus according to the first embodiment is described, initially with reference to FIGS. 1 to 5.

Initially, in step S401, the decoding means 103 reads the program management data from the memory. This step is carried out, for example, immediately after the starting switch of the data playback apparatus is turned on. Next, in step S402, the decoding means 103 enters the instruction signal input waiting state. Although not shown in FIG. 1, the instruction signal is input to the decoding means 103 through the user interface of the data playback apparatus. When the instruction signal is input, the contents of the instruction signal are analyzed in steps S403 and S404. When the instruction signal is a program playback instruction signal (step S403), the process proceeds to a program playback process in step S405. On the other hand, when the instruction signal is a program erasure instruction signal (step S404) the process proceeds to a program erasure process in step S406.

FIG. 5 is a flowchart for explaining the details of the program playback process (step S405). Initially, in step S501, a program ID (Gn) for an instructed program "n" is generated.

The program ID generation method is previously programmed in the data decoding means 103. The ID is one for identifying a program data folder or movie data file in the program management data, and corresponds to the program data folder or movie data file in the memory 102 in a one-to-one relationship. Since the ID is generated on the basis of the combination of the program data folder and the movie data file, even if there are the same movie data file names, when their program data files are different from each other, the IDs are not the same. The ID can be, for example, an integer of 32 bits. The most significant 8 bits are used for identifying either a folder or a file. The following 12 bits indicate a program data folder number. The least significant 12 bits indicate a movie data file number in the case where the ID shows a file.

Next, in step S502, a program ID which matches the program ID generated in step S501 is retrieved from the management data which are read in step S401. The information concerning each program contains the program ID, as shown in FIG. 3(b) by reference numeral 307. Program information having this program ID which matches the generated program ID is information concerning the program to be played.

Then, in step S503, variables i and M are prepared, and zero and the total number of the movie data files are set as the initial values of these variables, respectively. The total number of the movie data files is stored in the information concerning the program, as shown in FIG. 3(b) by reference numeral 309.

In step S504, the variables i and M are compared with each other, and when the variable i is smaller than the variable M, the process proceeds to step S505. On the other hand, when the variable i is equal to or larger than the variable M, the data playback process is finished, and the decoding means 103 returns to the instruction signal input waiting state of step S402. Now, a description is given as an example of a case where the playback of PRG001 as the first program 203 in FIG. 2 is instructed. PRG001 contains two movie data files 208 and 209. Therefore, the total number of the movie data files is recorded as "2", and the variable M is set at "2".

Next, in step S505, the first movie data file 208 is read, and then the media data such as compressively coded video and audio included in the file are successively decoded and output. The display means 104 displays these data. In this case, the two movie data files are played according to the order in which the movie data file IDs are arranged in FIG. 3(b).

When the reading and decoding of the first movie data file is finished, "1" is immediately added to the variable i in step S506, and then the process returns to step 504 to compare the variables i and M. Since the variable M is "2" and the variable i is now "1", because "1" has been added thereto, the process proceeds to step S505 and the second movie data file is read and decoded similarly.

When the reading and decoding of the second movie data file is finished, "1" is immediately added to the variable i in step S506 and then the process returns to step S505 to compare the variables i and M. Since the variable M is "2" and the variable i is now "2", the condition of step S504 is not met and the process is finished.

Next, the program erasure process in the data playback apparatus according to the first embodiment is described with reference to FIG. 6.

Initially, in step S601, a program ID (Gn) for an instructed program "n" is generated. This program ID is generated on the basis of the ID generation method as that described in step S501.

Next, in step 602, a program ID which matches the program ID generated in step S601 is retrieved from the management data which are read in step 401. The information concerning each program contains the program ID, as shown in FIG. 3(b) by reference numeral 307. Program information having this program ID which matches the generated program ID is information concerning the program to be erased.

Then, in step 603, the program attribute 308 shown in FIG. 3(b) is examined. The program attribute contains a protection flag indicating whether or not the program is protected. When the protection flag is true, it is assumed that the program is protected and the erasure is inhibited. In this case, the condition of step S603 is not met, and then the process is finished. That is, the erasure process is not carried out.

When the protection flag is false, in step S604, the program information concerning the program "n" is eliminated from the read-in program management data, then "1" is subtracted from the value of the total number 301 of programs, and the resultant value is replaced with the management data in the memory.

Then, in step 605, all files included in the folder of the program "n" are erased from the memory, and then the program data folder "n" is also erased from the memory.

In FIG. 1, the memory 102 can have an installable/removable structure. With this structure, a program which is previously recorded by another apparatus can be easily played.

In this first embodiment, the program data folders and the movie data files are identified by the IDs in the program management data file. However, the program data folder names and the movie data file names can be recorded in place of the IDs.

In this first embodiment, the management data are stored in the management data folder MGR_INFO 202 shown in FIG. 2. However, the management data can be stored directly under the route folder SDV 201 and the management data folder can be omitted.

In addition, in this first embodiment, the program management data file contains the information concerning all programs. However, the information concerning each program as shown in FIG. 3(b) can be stored separately in each program data folder.

Further, in addition to the movie data file, a playback control file for each movie data file can be stored as data which are stored in the program data folder. For example, playback start addresses of a movie data file at intervals of one second are recorded in the playback control file. When only video frame data at every one second are decoded by the decoding means 103 to perform high-speed playback, data of one video frame is successively read from the playback start address of the movie data file to be decoded, by using the playback control file, and as a result, the high-speed playback is realized. Further, even when the user designates a playback start time in the program, the jump position can be also decided at high speed by using the playback control file. Further, the playback control data is not limited to files other than the movie data file, but the movie data file can have a file structure in which playback control data are multiplexed at the head or rearmost position of the movie data file.

In this first embodiment, the file which is obtained by multiplexing compressively coded audio or video data is described as the movie data file. However, even files including compressively coded still pictures, text data and the like can be also processed by the data playback apparatus 101 of the first embodiment.

Further, in this first embodiment, the data playback apparatus 101 is realized by hardware. However, the decoding means 103 of the data playback apparatus 101 can be realized by software. For example, the decoding means 103 can also be realized in a computer system by using a software program which is programmed such that the processes in the decoding means 103 shown in FIGS. 4 to 6 are carried out by a CPU (Central Processing Unit). Even when the data playback apparatus 101 of the first embodiment is realized by this software, the same effects as those in the first embodiment can be obtained. The above-mentioned software program can be stored in a storage medium such as a floppy disk, an optical disk, a magnetic disk, an IC card, and a ROM cassette.

Second Embodiment

Figure 7:
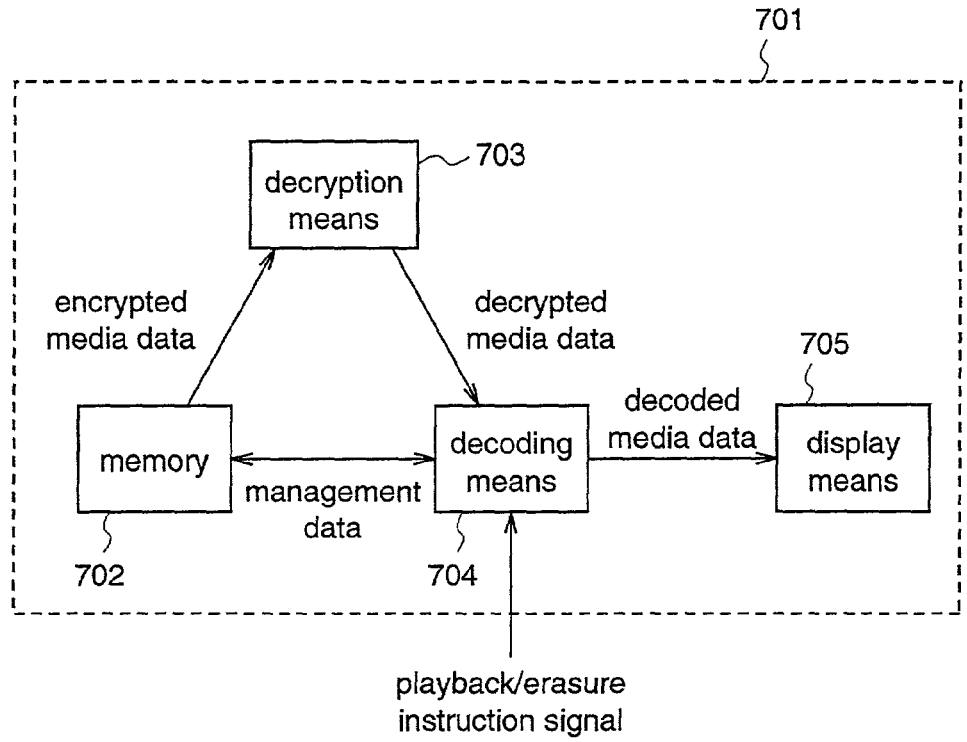
FIG. 7 is a block diagram illustrating a structure of a data playback apparatus according to a second embodiment of the present invention.

A data playback apparatus according to the second embodiment of the present invention will be described with reference to FIG. 7. FIG. 7 is a block diagram illustrating a structure of the data playback apparatus 701 of the second embodiment. The difference between the data playback apparatus 701 of the second embodiment and the data playback apparatus 101 of the first embodiment is that a decoding means (unit) 704 carries out reading of the media data via a decryption means (unit) 703. An encryption process is carried out for at least part of the movie data files stored in a memory 702. The decryption means 703 outputs a movie data file which is obtained by decrypting an encrypted part of a movie data file read from the memory 702, as a movie data file requested by the decoding means 704 through the processes of the first embodiment.

The structure of the memory 702, the processing of the decoding means 704, and the processing of a display means (unit) 705 are the same as those in the data playback apparatus 101 according to the first embodiment.

Figure 8:
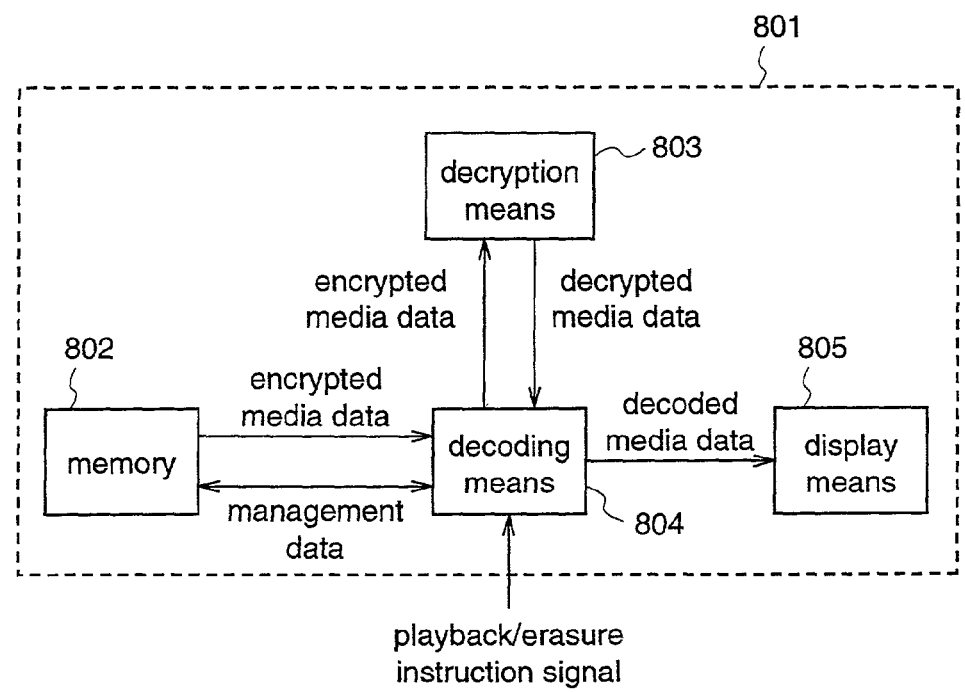
FIG. 8 is a block diagram illustrating a structure of a data playback apparatus according to a second embodiment of the present invention.

In this second embodiment, the decryption means 703 is between the memory 702 and the decoding means 704, and the decoding means 704 requests a movie data file from the decryption means 703. However, like a data playback apparatus 801 as shown in FIG. 8, for example, a decoding means (unit) 804 can carry out the processing by reading an encrypted movie data file from a memory 802, thereafter outputting the encrypted movie data file to a decryption means (unit) 803, and inputting the movie data file which has been decrypted by the decryption means 803.

Third Embodiment

Figure 9:
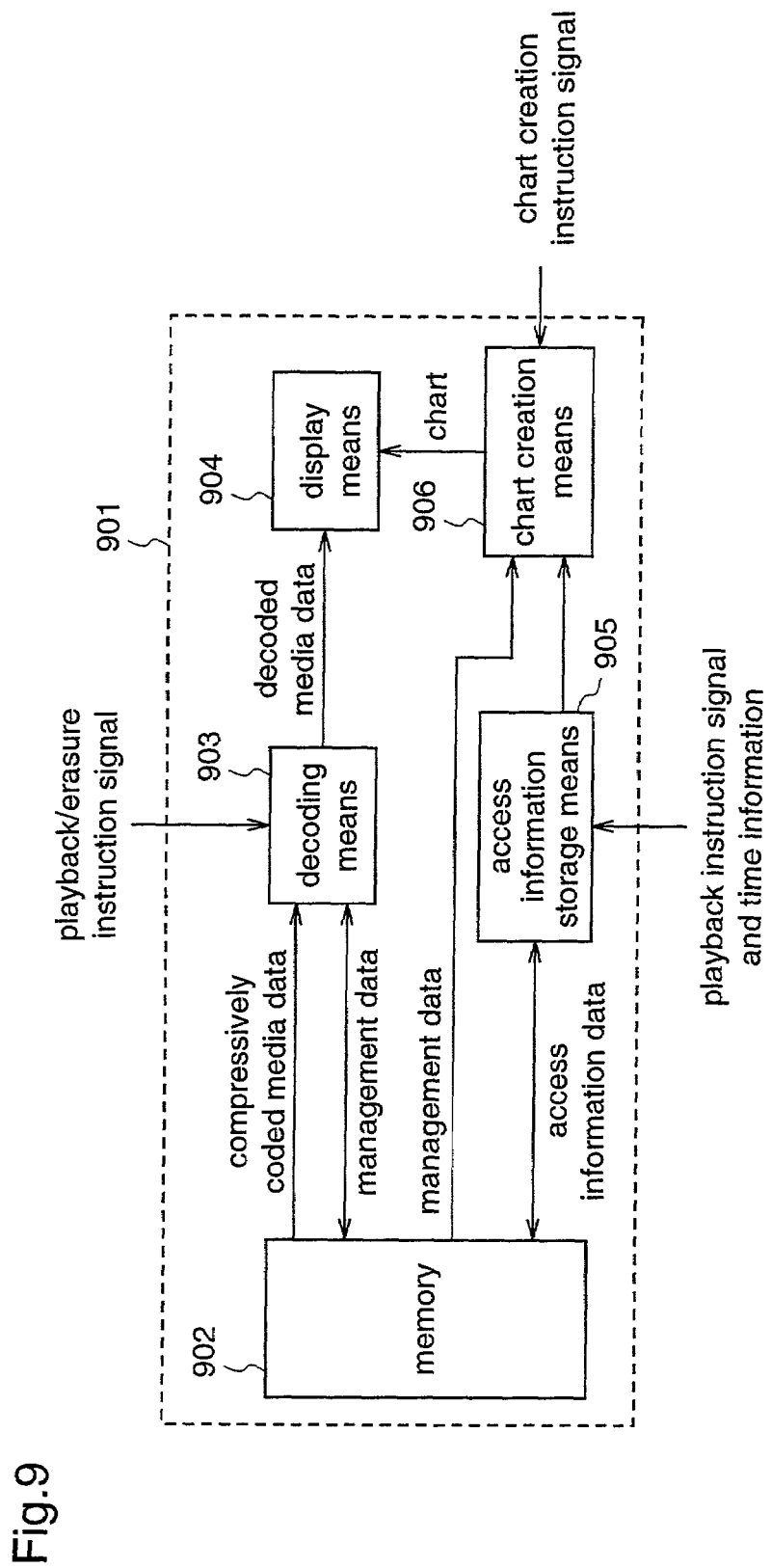
FIG. 9 is a block diagram illustrating a structure of a data playback apparatus according to a third embodiment of the present invention.
Figure 11:
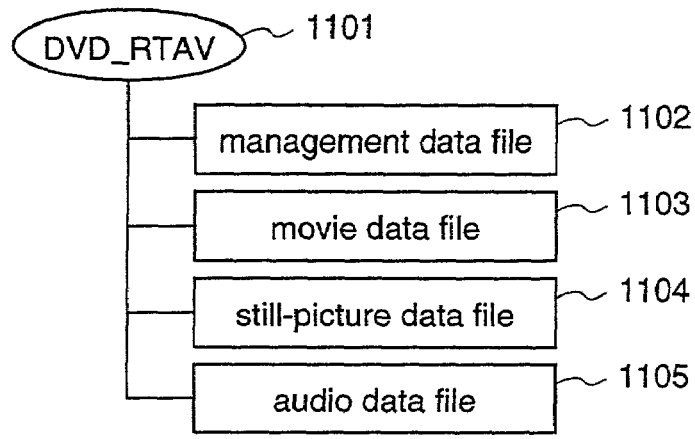
FIG. 11(a)–11(c) are schematic diagrams for explaining the structures of files stored in a memory of a prior art data playback apparatus.
Figure 11:
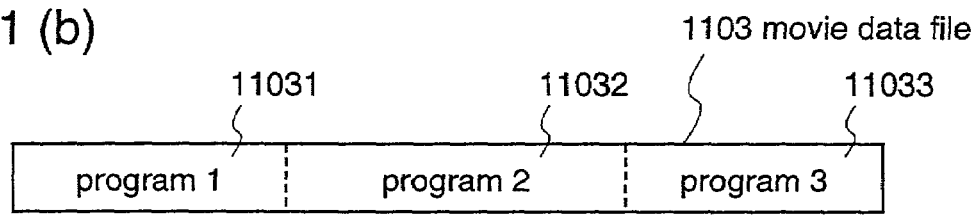
Figure 11:
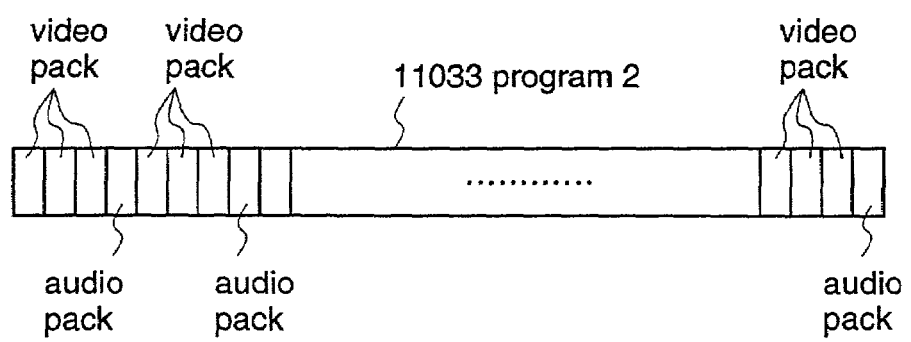
Figure 12:
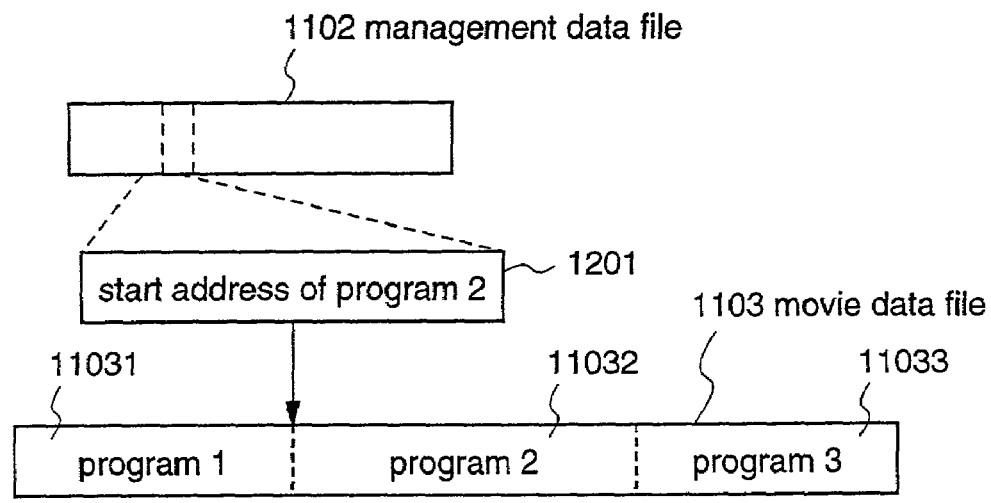
FIG. 12 is a schematic diagram for explaining a program playback process of the prior art data playback apparatus.
Figure 13:
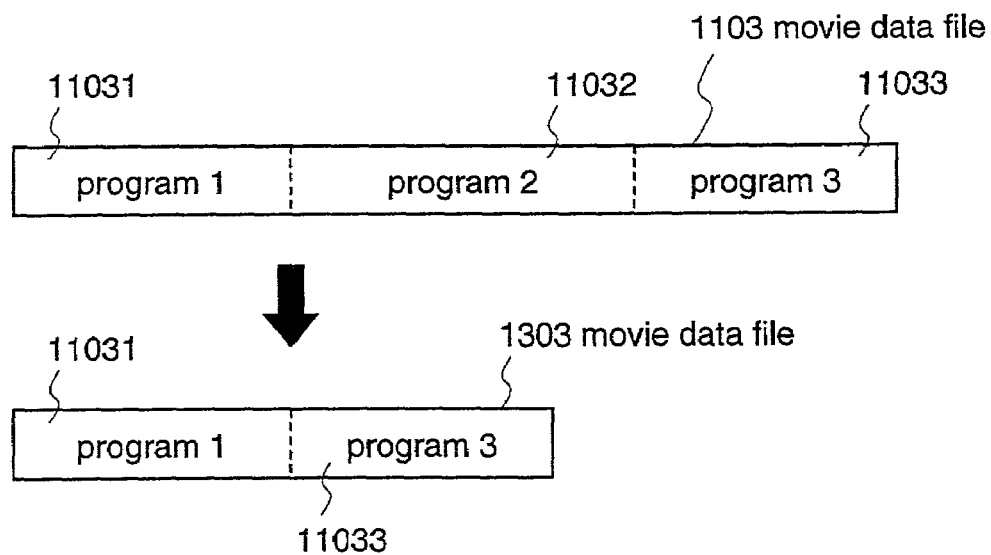
FIG. 13 is a schematic diagram for explaining a program erasure process of the prior art data playback apparatus.

FIG. 9 is a block diagram illustrating a data playback apparatus according to the third embodiment of the present invention.

As shown in FIG. 9, the data playback apparatus 901 of the third embodiment comprises: a memory 902 for containing compressively coded media data and management data; a decoding means (unit) 903 for receiving a playback instruction signal/erasure instruction signal, receiving the media data in accordance with the management data stored in the memory 902, and decoding the media data; a display means (unit) 904 for displaying the decoded media data, an access information storage means (unit) 905 for reading/writing number-of-access information indicating the number of times that a program was played and latest access date/time information indicating the latest time when the program was played, from/onto the memory 902 as access information data; and a chart creation means (unit) 906 for creating a chart by rearranging program data folders on the basis of the number-of access information, and outputting the chart to the display means 904.

Hereinafter, the operation of the data playback apparatus 901 of the third embodiment for creating the chart is described.

FIG. 10 is a diagram showing an example of the access information and an example of the chart in the data playback apparatus of the third embodiment.

The access information storage means 905 writes the number-of-access information indicating the number of times that the program was played and the latest access data/time information indicating the latest time when the program was played, onto the memory 902 as the access information data, in accordance with the playback instruction signal and time information which are input from outside of the apparatus 901.

When a chart creation instruction signal is input from outside of the apparatus 901 to the chart creation means 906, the access information storage means 905 reads the number-of-access information from the memory 902 and outputs the read number-of-access information to the chart creation means 906.

The chart creation means 906 receives the number-of-access information output by the access information storage means 905 and the management data read from the memory 902, respectively, and creates the program chart on the basis of the number-of-access information by rearranging the programs in order of the descending number of accesses, to output the chart to the display means 904.

As described above, the data playback apparatus 901 of the third embodiment displays the chart of programs rearranged in order of the descending number of accesses. Therefore, even in such a miniature playback terminal in which the displayable number of characters or number of lines is limited and the number of titles of programs which can be displayed at a time is accordingly limited, the user can easily select a frequently accessed program. Also, when an already stored program is to be erased from the memory, the one having a smaller number of accesses is displayed with priority, and therefore, the selection of a program to be erased can be easily performed.

In this third embodiment, the chart creation means 906 creates the chart by rearranging the program data folders on the basis of the number-of-access information. However, the chart creation means 906 can also create the chart by rearranging the program data folders on the basis of the latest access data/time information.

Further, in this third embodiment, the program ID and the number of accesses are displayed, while the title information and the like of each program included in the management data can be displayed.

Further, the access information can be stored as part of the management data, or stored in the management data folder as another folder. Alternatively, the access information can be stored as one of the files in each program data folder.

What is claimed is:

1. A data playback apparatus comprising:
a memory which has at least two program data folders each containing a program composed of compressively coded data including at least one video data file, and a management data folder containing management data which include information each indicating attribute information, a playback duration, and title information concerning each program;
a decoding unit for selecting at least one program data folder by referring to the management data based on playback instruction data, which are information concerning an instruction of playback of a program and which are input from outside said apparatus, reading compressively coded data which are stored in the selected program data folder, decoding the read compressively coded data, and outputting decoded data;
a display unit for displaying the decoded data;
an access information storage unit for reading/writing, from/onto said memory, at least one of number-of-access information indicating the number of times that a program was played and latest access date/time information indicating a latest time when the program was played; and
a chart creation unit for creating a chart by rearranging program data folders based on one of the number-of-access information and the latest access date/time information, and outputting the created chart to said display unit.

* * * * *